US009604650B2

(12) United States Patent
Geissenhöner

(10) Patent No.: US 9,604,650 B2
(45) Date of Patent: Mar. 28, 2017

(54) MOTOR VEHICLE COMPRISING A REMOTE STARTER UNIT

(71) Applicant: AUDI AG, Ingolstadt (DE)

(72) Inventor: Martin Geissenhöner, Ingolstadt (DE)

(73) Assignee: AUDI AG, Ingolstadt (DE)

( * ) Notice: Subject to any disclaimer, the term of this patent is extended or adjusted under 35 U.S.C. 154(b) by 0 days.

(21) Appl. No.: 14/902,543

(22) PCT Filed: Jun. 25, 2014

(86) PCT No.: PCT/EP2014/001727
§ 371 (c)(1),
(2) Date: Dec. 31, 2015

(87) PCT Pub. No.: WO2015/000562
PCT Pub. Date: Jan. 8, 2015

(65) Prior Publication Data
US 2016/0368507 A1    Dec. 22, 2016

(30) Foreign Application Priority Data

Jul. 1, 2013 (DE) ..................... 10 2013 010 984

(51) Int. Cl.
*B60W 50/00*    (2006.01)
*B60W 50/10*    (2012.01)
(Continued)

(52) U.S. Cl.
CPC ..... *B60W 50/0098* (2013.01); *B60H 1/00657* (2013.01); *B60R 25/04* (2013.01);
(Continued)

(58) Field of Classification Search
CPC ... B60W 50/0098; B60W 50/00; F02N 11/08; F02N 11/10; B60H 1/00657
(Continued)

(56) References Cited

U.S. PATENT DOCUMENTS 5,757,086 A    5/1998  Nagashima
8,710,949 B2   4/2014  Ledendecker
(Continued)

FOREIGN PATENT DOCUMENTS

DE    102008039303 A1    3/2010
DE    102009022638 A1    12/2010
(Continued)

OTHER PUBLICATIONS

English Translation of International Preliminary Report on Patentability by WIPO for PCT/EP2014/001727 mailed Aug. 11, 2016.
(Continued)

*Primary Examiner* — Tan Q Nguyen
(74) *Attorney, Agent, or Firm* — Staas & Halsey LLP

(57) ABSTRACT

A remote start signal is received wirelessly from outside a motor vehicle and, upon receiving the remote start signal, an internal combustion engine in the vehicle is started and a first device group is activated, including at least one device designed to prepare driving off with the motor vehicle, thus setting the motor vehicle to a "remote start" state. A control unit of the motor vehicle is designed to determine whether, in the "remote start" state and before driving off, a person is carrying out a predetermined operating action in or on the motor vehicle that is unsuitable for driving off and, if necessary, to switch the motor vehicle to an "ignition ON" state in which the internal combustion engine is switched off and a second device group consisting of at least one comfort device is switched ready for operation.

15 Claims, 2 Drawing Sheets

(51) Int. Cl.
   B60R 25/04 (2013.01)
   B60R 25/24 (2013.01)
   B60R 25/23 (2013.01)
   B60H 1/00 (2006.01)
   F02N 11/08 (2006.01)

(52) U.S. Cl.
   CPC .............. B60R 25/23 (2013.01); B60R 25/24 (2013.01); B60W 50/10 (2013.01); B60W 2550/40 (2013.01); B60W 2710/06 (2013.01); B60W 2710/30 (2013.01)

(58) Field of Classification Search
   USPC .............................. 701/2, 36; 340/901, 425.5
   See application file for complete search history.

(56) References Cited

U.S. PATENT DOCUMENTS

| 2005/0225175 | A1  | 10/2005 | Maehara et al. |
| 2008/0117079 | A1* | 5/2008  | Hassan ................ B60R 25/045 340/901 |
| 2008/0203815 | A1  | 8/2008  | Ozawa et al. |
| 2009/0265048 | A1  | 10/2009 | Ono et al. |
| 2011/0148566 | A1* | 6/2011  | Ledendecker .......... B60R 25/04 340/3.1 |
| 2011/0202201 | A1  | 8/2011  | Matsubara |
| 2012/0078443 | A1  | 3/2012  | Matsubara |
| 2013/0211623 | A1* | 8/2013  | Thompson ............. G07C 5/008 701/2 |

FOREIGN PATENT DOCUMENTS

| DE | 102010052547 A1 | 5/2012 |
| DE | 102013010984    | 7/2013 |
| WO | 2014/001727     | 6/2014 |

OTHER PUBLICATIONS

International Search Report for PCT/EP2014/001727 mailed Nov. 17, 2014.

* cited by examiner

MOTOR VEHICLE COMPRISING A REMOTE STARTER UNIT

CROSS REFERENCE TO RELATED APPLICATIONS

This application is the U.S. national stage of International Application No. PCT/EP2014/001727 filed on Jun. 25, 2014. This International Application claims the benefit of German Application No. 10 2013 010 094.1 filed on Jul. 1, 2013, both applications are incorporated by reference herein in their entirety.

BACKGROUND

Described below is a motor vehicle having a remote start unit. A remote start unit of this type is designed to receive a remote start signal wirelessly from outside the motor vehicle and, upon receiving the remote start signal, to start an internal combustion engine of the motor vehicle and operate devices which prepare the driving off with the motor vehicle. A remote start unit can be used to cause the motor vehicle, for example in particularly cold regions, to be warmed up by a remote start signal before a driver enters the motor vehicle and drives off.

A motor vehicle having a remote start unit is known, for example, from US 2011/0202201 A1. The motor vehicle described therein can be switched by a radio signal to the "remote start" state. In the motor vehicle, in the case where a person remotely starts the motor vehicle a radio signal, then enters the vehicle and inserts an ignition key into the ignition lock, it is avoided that the internal combustion engine of the motor vehicle is thereby initially switched off because the ignition key is initially in the OFF position following the insertion. The internal combustion engine continues to run and thus enables the driver initially to perform an operating action necessary for driving off, for example the turning of the ignition key in the ignition lock. Thereafter, the motor vehicle is then switched to a normal state which it would also be in if the person had started the motor vehicle directly from the OFF state by turning the ignition key.

A motor vehicle with a remote startup device is similarly described in US 2009/0265048 A1. The motor vehicle has an authorization device which, following the remote startup, when the motor vehicle is in the "remote start" state with the internal combustion engine running, prevents an unauthorized person from entering the motor vehicle and driving off with it. To do this, a check is carried out by an authorization device to determine whether an authorized radio key is located inside the motor vehicle while a person attempts to drive off with the remotely started motor vehicle.

Further motor vehicles with a remote start device are known from US 2008/0203815 A1, U.S. Pat. No. 5,757,086 A, DE 10 2009/022 638 A1 and DE 10 2008 039 303 A1. These motor vehicles also have security devices to prevent an unauthorized use of the remotely started motor vehicle. The motor vehicle can therefore be switched only by an authorized person from the "remote start" state to the normal state with the engine running and use of all devices of the motor vehicle. If an unauthorized person uses the remotely started motor vehicle, the latter is switched to the OFF state.

In the case of a motor vehicle having a remote start unit, only the use of a predetermined device group is possible in the "remote start" state, the group including one or more devices of the motor vehicle with which the driving off is prepared. One of these devices is normally an air conditioning unit for heating the passenger compartment or the engine. If, in a remotely started motor vehicle, a person then initially wishes to use a device that is not necessary for driving off, i.e., a comfort device, such as, for example, a window opener, a device of this type cannot normally be switched on in the "remote start" state. The person must therefore first drive off a short distance with the motor vehicle so that the control mechanism of the remote start unit is deactivated. Only then can the person, for example, switch off the internal combustion engine itself and operate the comfort devices with the ignition switched on.

SUMMARY

In a motor vehicle having a remote start unit, an operating person is provided with a better control facility via the remote start unit. In particular, the remote start unit is designed to receive a remote start signal wirelessly from outside the motor vehicle, i.e., for example, a corresponding radio signal of a remote operation, and then, upon receiving the remote start signal, to start an internal combustion engine of the motor vehicle. Furthermore, a predetermined first device group is activated, including at least one device of the motor vehicle which is intended to prepare a driving off with the motor vehicle in the absence of the driver, i.e., for example, the aforementioned air conditioning unit. However, other devices of the motor vehicle which do not belong to the first device group are not started, but remain disconnected from the voltage supply, such as, for example, the vehicle battery, or are deactivated in a different manner so that they cannot be operated. On the whole, upon receiving the remote start signal, the vehicle is switched by the remote start unit to the "remote start" state: the internal combustion engine is running, the at least one device of the first device group is activated, but the motor vehicle is otherwise not prepared for use by a person. Thus, for example, neither can a window opener be operated nor is, e.g., the lighting of the instrument cluster switched on.

In order to provide an operating person with a facility to control the state of the motor vehicle herein, in the motor vehicle a control unit is provided which is designed to determine, in the "remote start" state and also before driving off, whether, instead of an operating action relating to driving off, a person is carrying out a different, predetermined operating action in the motor vehicle that is, however, unsuitable for driving off. An unsuitable operating action of this type may, for example, be the actuation of the window opener. However, as an operating action, it may also be detected, for example, whether the person, when attempting to drive off, does not secure the motor vehicle, for example, by stepping on a brake pedal. If the unsuitable operating action is detected by the control unit, the motor vehicle is in this case switched by the control unit into an "ignition ON" state in which the internal combustion engine is switched off and a predetermined second device group, including at least one comfort device of the motor vehicle is switched ready for operation or is even switched on. To do this, for example, each comfort device can be connected to a battery of the motor vehicle or may have been activated or switched to a standby state, e.g., via a bus signal. In other words, the motor vehicle engine is switched off and the motor vehicle is switched to a state such as the state which also occurs when the ignition key is inserted in the case of a conventional motor vehicle and is set in the ignition lock to the first switching stage (ignition ON). The aforementioned control unit may, for example, be a control unit or a program module of a control unit also used for other purposes, or a group including a plurality of devices and/or program modules. The person skilled in the art can specify which devices are allocated to the first device group and which devices are allocated to the second device group according to requirements. The following devices, for example, have proven suitable for the second device group: the aforementioned window opener, an instrument cluster, a central locking internal button for operation from the passenger compartment, an on-board computer. In particular, at least one of the devices of the second device group is different from all devices of the first device group.

The method described below is carried out accordingly through the operation of the described components of the motor vehicle.

The motor vehicle and the method offer the advantage that a person in the motor vehicle can immediately use the comfort devices even if the motor vehicle was previously in the "remote start" state. Nor does the person initially have to laboriously induce the normal state (engine running and ignition switched on) in order to then switch off the engine once more and switch on the ignition once more in order to thus be able to switch on the comfort devices.

In order to be able to induce the "ignition ON" state starting from the "remote start" state, in one embodiment of the motor vehicle in which a terminal 15 line according to DIN 727552 (DIN—Deutsche Industrienorm [German Industry Standard]) is provided, the control unit is designed, in order to change the state from "remote start" to "ignition ON", to supply the terminal 15 line with an electric voltage, to provide it as a supply voltage, e.g., for a switching relay via which the comfort devices of the second device group are connected to the battery. The motor vehicle may also have a communication bus and the control unit may also be designed in a known manner to switch the second device group ready for operation or switch it on by a bus signal in order to connect the second device group. This offers the advantage that, even in a motor vehicle which provides a conventional control of the comfort devices via the ignition, the method can be retrofitted at low cost into an embodiment of the motor vehicle.

A further embodiment of the motor vehicle provides a theft protection in that the control unit is designed to induce the changeover from the "remote start" state to the "ignition ON" state only if an authorization device signals a successful completion of a predetermined authorization procedure. An authorization procedure means a process which verifies an operating authorization of a person located in the motor vehicle. An authorization device known per se from the related art can be used here, such as, for example, the verification of a radio key already described. However, a code word or PIN (Personal Identification Number), for example, may also be requested from the person.

An embodiment of the motor vehicle relates to the operating action that is unsuitable per se for driving off, but instead only effects the state changeover to the "ignition ON" state. Here, it is provided to detect the actuation of a start operating element. The start operating element is actually provided to start the internal combustion engine. A start operating element of this type may, for example, be a start button or start panel, as is known in connection with a radio key system. In order to then distinguish between a wish to drive off and the wish to change over to the "ignition ON" state, it is provided in the embodiment of the motor vehicle to check simultaneously whether the brake of the motor vehicle is unactuated, i.e., the person, for example, does not actuate the brake pedal. With the combination of actuation of the start operating element and a simultaneously unactuated brake, a changeover is effected to the "ignition ON" state in which the internal combustion engine is then switched off but the comfort devices can be operated. The use of the start operating element as a signaling device offers the advantage that an operating person can use the same operating element for driving off (actuating the start operating element and simultaneously actuating the brake) and also to induce the "ignition ON" state (actuating the start operating element and simultaneously not actuating the brake).

In order not to consume an unnecessary amount of fuel through the operation of the internal combustion engine in the event of an accidental triggering of the remote start signal, one embodiment of the motor vehicle provides to measure a time period since the changeover to the "remote start" state by a time control of the motor vehicle and at least to switch off the internal combustion engine if the measured time period is greater than a predetermined maximum running time, i.e., for example, is greater than 5 min or 10 min. Since a motor vehicle is then normally prepared by the first device group for driving off, an unnecessary exhaust gas emission is thereby avoided.

However, this automatic deactivation of the internal combustion engine may not always be desirable. If, for example, the motor vehicle is switched to the "remote start" state in order to heat the motor vehicle passenger compartment, and if a person remains in the motor vehicle passenger compartment to warm up, the person would normally like to determine for himself when the air conditioning is again ended. Since a running internal combustion engine is normally necessary for operating an air conditioning system due to its power requirement, it is not appropriate to change over to the "ignition ON" state. One embodiment of the motor vehicle provides an operating person here with a further flexible control of the operating state of the motor vehicle. A detection device of the motor vehicle determines whether at least one person is present in the motor vehicle and in this case signals a detected presence to the control unit as a detection signal with the "person present" content. The described control unit is then extended in order to end the "remote start" state if a transition of the detection signal from "person present" to "no person present" takes place previously in the "remote start" state. In other words, the "remote start" state is ended, i.e., in particular, the internal combustion engine is switched off if all persons have left the motor vehicle. A person detection of the type necessary for this embodiment can be implemented in a manner known from the related art. A seat occupancy recognition, a monitoring of the motor vehicle passenger compartment by a camera, in particular an infrared camera, and a verification of a central locking could be cited here as examples. However, any other technology can also be used for the person detection.

If both a time control and a person detection are present in the motor vehicle, one advantageous embodiment of the motor vehicle provides to deactivate the time control unit in the "remote start" state following a further reception of a remote start signal. In other words, a person must therefore trigger the remote start signal a first time in order to switch the motor vehicle to the "remote start" state and, in the event of further generation of the remote start signal, cause the time control for the automatic deactivation of the internal combustion engine to be inactive. The internal combustion engine is therefore switched off only when the person leaves the motor vehicle.

Only the detection of operating actions which are not suitable for driving off has hitherto been described. The control unit of the motor vehicle may also be designed to determine, in the "remote start" state and before driving off, whether the person is carrying out an operating action in the motor vehicle which is predetermined but provided for driving off. This operating action may include the actuation of the start operating element for starting the internal combustion engine with a simultaneously actuated brake. The detection of operating actions of this type can be enabled with the sensor system of a motor vehicle known per se. If the control unit detects an operating action provided for driving off, it switches the motor vehicle during continuous operation of the internal combustion engine to a normal "engine running" state. In other words, the person takes over the control of the running engine from the remote start device as a result. In the normal state, the internal combustion engine then normally continues to run and the second device group, i.e., the comfort devices, is connected to the battery. This is the normal operating state provided for driving the motor vehicle. Here also a verification of the authorization of the person by an authorization device of the motor vehicle may be provided in the motor vehicle, i.e., for example, the verification of a presence of a radio key in the passenger compartment of the motor vehicle. Upon detection of an unauthorized person by the authorization device, the motor vehicle may be switched to an OFF state in which the internal combustion engine is switched off and the first and second device groups are disconnected from the battery. The internal combustion engine is, however, at least switched off.

The developments of the method include features of the type already described in connection with the developments of the motor vehicle. For this reason, the corresponding developments of the method are not described again here.

BRIEF DESCRIPTION OF THE DRAWINGS

These and other aspects and advantages will become more apparent and more readily appreciated from the following description of a specific example embodiment, taken in conjunction with the accompanying drawings of which.

DETAILED DESCRIPTION OF THE PREFERRED EMBODIMENT

Figure 1:
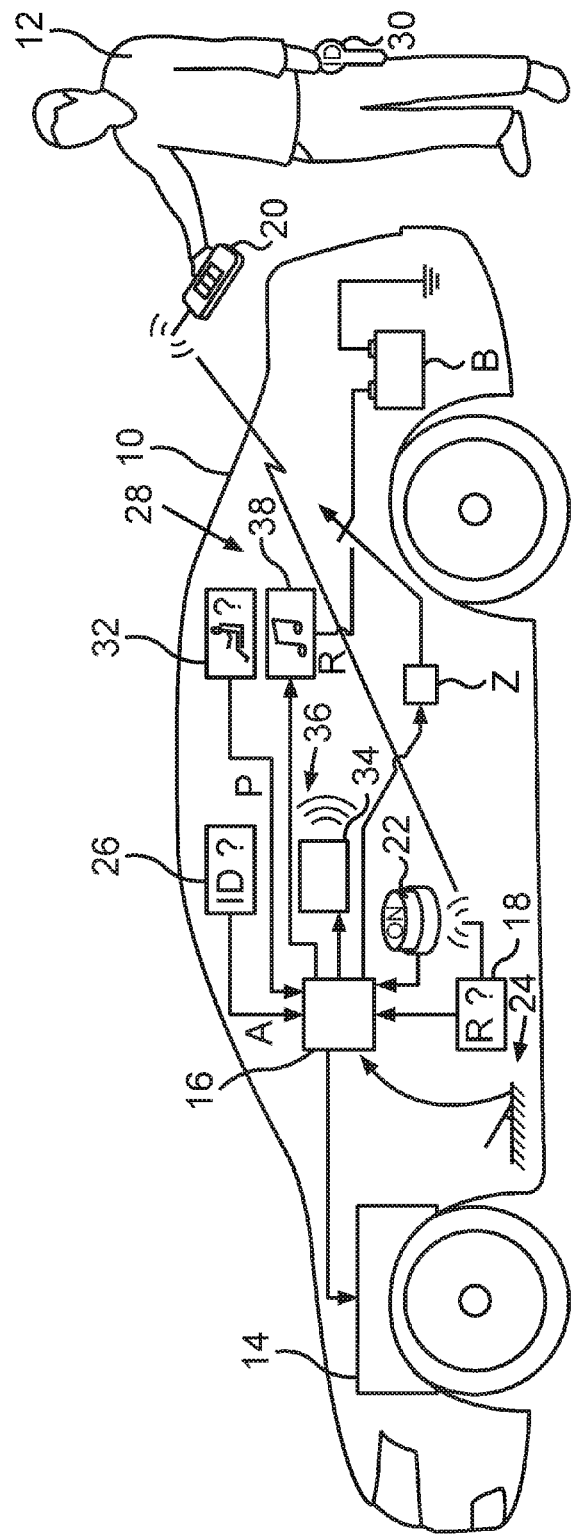
FIG. 1 is a schematic representation of an embodiment of the motor vehicle.

Reference will now be made in detail to the preferred embodiments, examples of which are illustrated in the accompanying drawings, wherein like reference numerals refer to like elements throughout.

In the example embodiment explained below, the described components of the example embodiment in each case represent individual features which are to be considered independently from one another and which also develop independently from one another and are therefore also to be regarded individually or in any combination other than the combination shown. Furthermore, the described embodiment can also be supplemented by further of the features already described.

FIG. 1 shows a motor vehicle 10 which may, for example, be an automobile. A person 12 who, for example, may be an owner of the motor vehicle 10 is located outside the motor vehicle 10. The motor vehicle 10 may have an internal combustion engine 14, i.e., for example, a gasoline engine or a diesel engine, as the propulsion engine. The internal combustion engine 14 can be started and can also be switched off by a control unit 16. The control unit 16 may, for example, include one or more control devices or one or more program modules. The motor vehicle 10 may furthermore have a remote start device 18. The remote start device 18 can be connected to the internal combustion engine 14 and/or the control unit 16. The remote start device 18 may be designed in a manner known per se to receive a remote start signal R from a remote control 20 which can be operated by the person 12. The remote control 20 may, for example, be a device provided exclusively for generating the remote start signal R or, for example, a smartphone which has corresponding control software (APP—application) by which the remote start signal R is generated by the smartphone in response to an operating command of the person. The motor vehicle 10 may furthermore have a start operating element 22 and a brake pedal 24. The start operating element 22 may, for example, be a start button which is provided to enable a keyless start of the internal combustion engine 14 as known per se from the related art.

The motor vehicle 10 may also have an authorization device 26 which checks, for example, on actuation of the start operating element 22, whether a radio key 30 in which identification data ID may be stored by which the person 12 is authorized to operate the motor vehicle 10 is located in a motor vehicle passenger compartment 28. The authorization device 26 may be designed in a manner known per se. The authorization device 26 signals by an authorization signal A, for example to the control unit 16, that the radio key 30 is located at a given time in a passenger compartment 28 of the motor vehicle 10.

The motor vehicle 10 may furthermore have a detection device 32 by which the presence of a person in the passenger compartment 28 is signaled by a detection signal P, for example to the control unit 16. The detection device 32 can similarly be based on technology known per se, for example a seat occupancy detection.

The motor vehicle 10 may have an air conditioning unit 34 by which, for example, warm air 36 can be blown into the passenger compartment 28. The air conditioning unit 34 may also be designed to heat, for example, the internal combustion engine 14.

The motor vehicle 10 may furthermore have one or more comfort devices 38, for example an infotainment system, a media playback device (for MP3 music files or Blu-ray or DVD storage media) and/or a navigation device and/or one (or more) window opener(s) and/or an instrument cluster and/or a central locking internal button and/or an on-board computer.

A battery B of the motor vehicle 10 can be provided to supply the comfort devices 38 with electric power. The comfort devices 38 can be electrically disconnected from the battery B by an ignition Z. The electrical connection between the battery B and the comfort devices 38 can be established by the ignition Z, for example on receiving a terminal 15 signal. Instead of an electrical disconnection by the ignition Z, the comfort devices 38 can also be permanently connected to the battery B and can be activated via a communication bus (not shown) in a known manner by a bus signal (terminal 15 bus signal) or can at least be switched ready for operation or deactivated by a bus signal in order to be switched off, so that they can no longer be operated by the driver. Corresponding control devices for this purpose are known.

Figure 2:
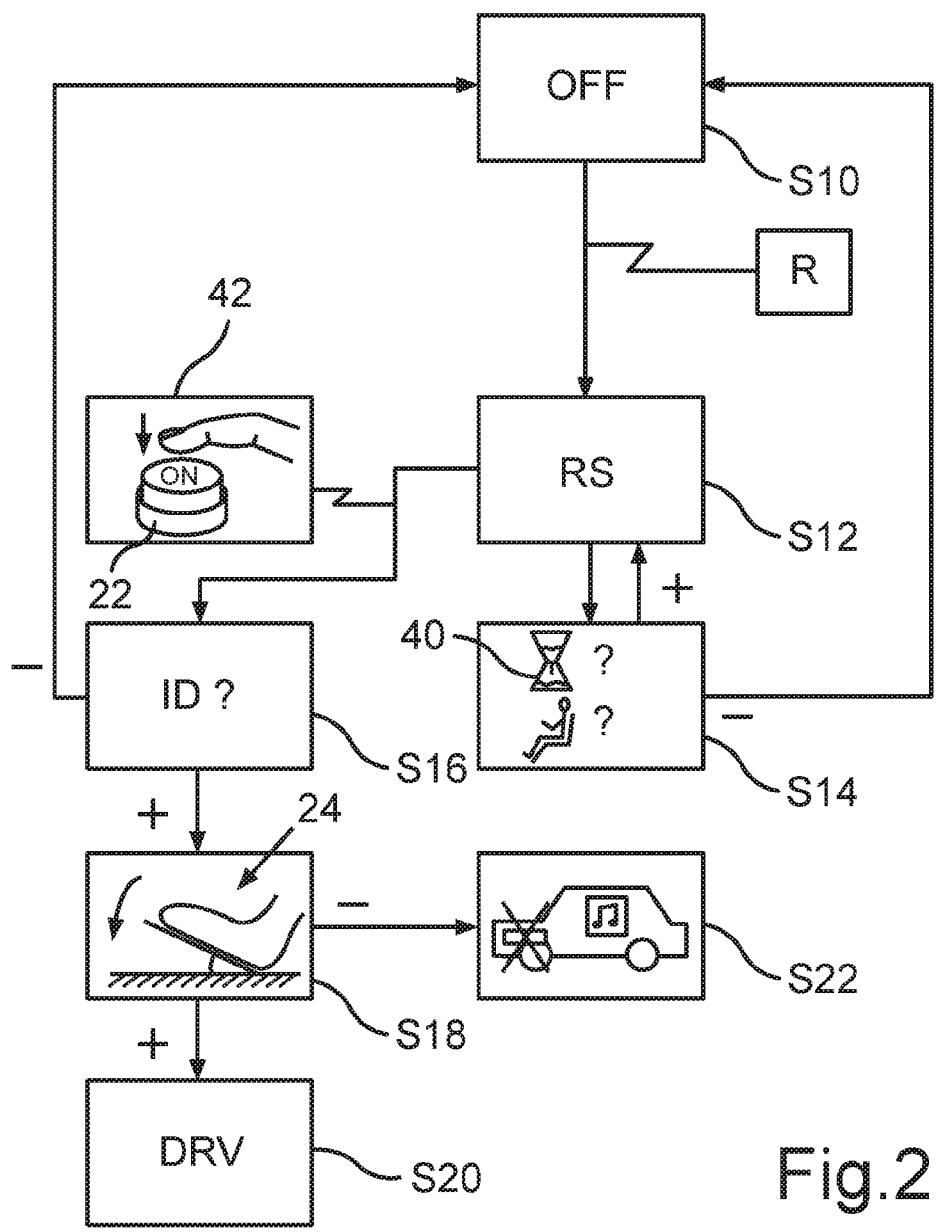
FIG. 2 is a state diagram in which state transitions of the motor vehicle from FIG. 1 are illustrated.

The motor vehicle 10 can be switched to different operating states by the control unit 16, as explained below with reference to FIG. 2.

In an OFF state S10, the internal combustion engine 14 and also the air conditioning device 34 and all comfort devices 38 are switched off. The motor vehicle 10 may be in the OFF state, for example, if it is parked for an indefinite time. If the person 12 wishes, for example, to pre-heat the motor vehicle 10 by the air conditioning unit 34 or cause the internal combustion engine 14 to warm up, the person 12 can generate the remote start signal R by the remote control 20 from outside the motor vehicle 10, which signal can then be received by the remote start unit 18. The remote start unit 18 signals the reception of the remote start signal R, for example to the control unit 16, which then switches the motor vehicle 10 to a state S12 which is also referred to here as the "remote start" (RS) state. In order to induce the "remote start" state S12, the control unit 16 starts the internal combustion engine 14 and activates the air conditioning unit 34. The remote start unit 18 therefore indirectly induces the state S12.

In the "remote start" state S12, a check can be carried out, for example, by the control unit 16 at previously determined times in a verification S14 in order to determine whether a predetermined time period has elapsed since the transition to the state S12. This can be implemented, for example, by a timing unit or a timer 40 of the motor vehicle 10. A check can also be carried out to determine whether the detection signal P of the detection device 32, following the transition to the "remote start" state S12, initially indicates that the person 12 was located in the passenger compartment 28 and thereafter got out. If the timer 40 has not yet expired and/or a person is still present in the passenger compartment 28 (symbolized in FIG. 2 by "+"), the motor vehicle 10 remains in the "remote start" state S12. If, on the other hand, the timer 40 has expired and/or the person 12 has gotten out ("−"), the motor vehicle 10 is switched, for example by the control unit 16, e.g., to the OFF state S10.

If the motor vehicle 10 is in the "remote start" state S12, it may be monitored whether the person 12 in the motor vehicle 10 is carrying out an operating action 42 on at least one predetermined component of the motor vehicle. Here, for example, a detected operating action 42 may be actuation of the start operating element 22. If the operating action is carried out, it can thus be provided that a check is initially carried out by the authorization device 26 in an authorization procedure S16 to determine whether the operating person 12 is authorized to operate the motor vehicle 10. To do this, for example, the presence of the radio key 30 in the passenger compartment 28 can be verified. If the operating person is not authorized (−), the motor vehicle 10 can be switched, for example, to the OFF state S10. If an authorized person is detected (+) in the authorization procedure S16, it can then be decided S18 whether the operating action 42 was intended for driving off with the motor vehicle 10 or merely an operating action not provided for driving off has been carried out. For example, it can be checked for this purpose whether the brake pedal 24 has been simultaneously actuated by the person 12 during the actuation of the start operating element 22.

If the person 12 has actuated the start operating element 22 and has simultaneously stepped on the brake pedal 24 (+), this is evaluated as a wish to drive off and the motor vehicle 10 is switched, for example by the control unit 16, to a normal state S20 (DRV—Drive) in which the internal combustion engine 14 is further operated and the comfort devices 38 are, for example, also simultaneously connected to the battery B of the motor vehicle 10. The driver, i.e., the person 12, can then use all devices of the motor vehicle 10 in a manner known per se and can also drive off with the motor vehicle 10.

In the transition from the "remote start" state S12 to the normal state S20, the internal combustion engine 14 is operated continuously. The engine running is therefore not interrupted, and instead the engine running can be taken over by the person 12 from the "remote start" state S12 for driving off. This offers the advantage that the person 12 can switch the motor vehicle 10 through takeover to the state which he requires.

If, on the other hand, the person 12 carries out an operating action 42 that is not suitable for driving off (−), the motor vehicle 10 is, for example, switched by the control unit 16 to an "ignition ON" state S22. In the state S22, the internal combustion engine 14 is again switched off, but the comfort devices 38 are electrically connected to the battery so that the comfort devices 38 can be used by the person 12.

On the whole, four particularly advantageous final states, in particular, result from the takeover function based on the remote start in the state S12.

1. The normal case of "Authorized takeover": The person 12 performs a start operation 42 via the start operating element 22 (normally by pressing a Kessy button with an actuated brake 24). If a key 30 belonging to the motor vehicle 10 is found in the internal area, i.e., the passenger compartment 28, following this start operation, the motor vehicle 10 is then switched to the normal state (engine running) S20, so that the person 12 can drive off.

2. "Unauthorized takeover attempt": A person performs a start operation 42 via the start operating element 22 (i.e., again normally by pressing a Kessy button with an actuated brake 24). If no key 30 belonging to the motor vehicle 10 is found in the passenger compartment 28, the engine running is then ended (e.g., transition to the OFF state S12). Driving off with the motor vehicle 10 is not possible (theft protection measure).

3. "Authorized takeover, ending of the engine running and switching on of the ignition": The person 12 performs an operation 42 via the start operating element 22 to switch on the ignition Z without the engine running, i.e., with the internal combustion engine 14 switched off (this can normally be signaled by pressing the Kessy button 22 without an actuated brake 24).

If a key 30 belonging to the vehicle is found in the passenger compartment 28 following the operation 42, the motor vehicle 10 is switched to the "ignition switched on+engine not running" state S22, wherein the person can use the comfort devices and other user facilities with the ignition Z switched on.

4. "No takeover": No operation of the start operating element 22 takes place, so that the "remote start" state continues (state S12).

5. (Optional state) "Remote start continues as long as driver present": An operation of the remote start operating element (for example the radio remote control 20, an app) and/or an operation on the air conditioning operating part of the air conditioning unit 34 takes place. If a driver presence P in the passenger compartment 28 is detected during this operation, the remote start engine running is continued as long as the driver, i.e., the person 12, is present. The person 12 can continue to use the air conditioning facility of the air conditioning unit 34. If required, the remote start (state S12) can also be interrupted here following expiry of a timer 40. If a driver absence is detected, i.e., for example, signaled by the detection signal P of the control unit 16, the engine running is ended, i.e., the internal combustion engine 14 is switched off.

A description has been provided with particular reference to preferred embodiments thereof and examples, but it will be understood that variations and modifications can be effected within the spirit and scope of the claims which may include the phrase "at least one of A, B and C" as an alternative expression that means one or more of A, B and C may be used, contrary to the holding in Superguide v. DIRECTV, 358 F3d 870, 69 USPQ2d 1865 (Fed. Cir. 2004).

The invention claimed is:

1. A motor vehicle having a start operating element to start an internal combustion engine, an authorization device, at least one comfort device and an air conditioning unit for at least one of heating the internal combustion engine and at least one of heating and cooling a passenger compartment, the motor vehicle comprising:
    a remote start unit receiving a remote start signal wirelessly from outside the motor vehicle and, upon receiving the remote start signal, starting the internal combustion engine of the motor vehicle, activating exclusively a predetermined first device group, including at least the air conditioning unit, in preparation of the motor vehicle being driven, and switching the motor vehicle to a remote start state; and
    a control unit determining, in the remote start state and before driving off, whether a person is carrying out a predetermined unsuitable operating action, one of in and on the motor vehicle, unsuitable for driving off, including detecting at least actuation of the start operating element for starting the internal combustion engine with a simultaneously unactuated brake as one predetermined operating action unsuitable for driving off, and, when the control unit detects the predetermined unsuitable operating action, switching the motor vehicle to an ignition ON state in which the internal combustion engine is switched off and a predetermined second device group including the at least one comfort device of the motor vehicle, not included in the first device group, is switched one of on and ready for operation, the control unit changing from the remote start state to the ignition ON state only when the authorization device signals successful completion of a predetermined authorization procedure verifying an operating authorization of the person.

2. The motor vehicle as claimed in claim 1, further comprising a battery and a terminal 15 line according to DIN 727552, and
    wherein the control unit supplies the terminal 15 line with an electric voltage connecting the second device group to the battery in changing from the remote start state to the ignition ON state.

3. The motor vehicle as claimed in claim 1, further comprising a communication bus, and
    wherein the control unit switches the second device group one of on and ready for operation by a bus signal instructing connection of the second device group.

4. The motor vehicle as claimed in claim 1, further comprising a time control device measuring a time period that has elapsed since changing to the remote start state and at least switching off the internal combustion engine when the time period measured is greater than a predetermined maximum running time.

5. The motor vehicle as claimed in claim 4,
    further comprising a detection device detecting a presence of at least the person in the motor vehicle and signaling a detected presence to the control unit by a detection signal, and
    wherein the control unit at least switches off the internal combustion engine when a transition of the detection signal from person present to no person present takes place in the remote start state.

6. The motor vehicle as claimed in claim 5, wherein the control unit deactivates the time control device in the remote start state upon at least one of receiving a further remote start signal and operation of at least one member of the first device group.

7. The motor vehicle as claimed in claim 1,
    further comprising a detection device detecting a presence of at least the person in the motor vehicle and signaling a detected presence to the control unit by a detection signal, and
    wherein the control unit at least switches off the internal combustion engine when a transition of the detection signal from person present to no person present takes place in the remote start state.

8. The motor vehicle as claimed in claim 1,
    wherein the control unit determines whether, in the remote start state and before driving off, the person is carrying out a predetermined suitable operating action provided for driving off in the motor vehicle and, when needed, switches the motor vehicle, with continuous operation of the internal combustion engine, to a normal engine running state in which the internal combustion engine is running and the second device group is connected to the battery, and
    wherein a prerequisite for changing to the normal engine running state is that an authorized person is carrying out the predetermined suitable operating action for driving off, and, upon detection of an unauthorized person by the authorization device, the motor vehicle changes to an OFF state in which at least the internal combustion engine is switched off.

9. The motor vehicle as claimed in claim 1, wherein the second device group includes at least an infotainment system.

10. A method for controlling an operating state of a motor vehicle having a remote start unit, comprising:
    receiving a remote start signal wirelessly from outside the motor vehicle;
    starting an internal combustion engine of the motor vehicle in response to the remote start signal;
    activating exclusively a predetermined first device group of the motor vehicle in preparation for driving the motor vehicle in response to the remote start signal, the first device group including at least an air conditioning unit for at least one of heating the internal combustion engine and at least one of heating and cooling a passenger compartment;
    determining, in the remote start state before driving off by a control unit of the motor vehicle, whether a person is carrying out a predetermined unsuitable operating action, one of in and on the motor vehicle, unsuitable for driving off, including at least actuation of a start operating element for starting the internal combustion engine with a simultaneously unactuated brake; and
    switching, if authorized and the predetermined unsuitable operating action is detected by the control unit, the motor vehicle to an ignition ON state in which the internal combustion engine is switched off and a predetermined second device group including at least one comfort device of the motor vehicle is connected to a battery of the motor vehicle to operate the second device group, said switching from the remote start state to the ignition ON state being authorized only if an authorization device signals successful completion of a predetermined authorization procedure verifying operating authorization of the person.

11. The method as claimed in claim 10, further comprising:
   measuring a time period that has elapsed since changing to the remote start state; and
   switching off at least the internal combustion engine when the time period measured is greater than a predetermined maximum running time.

12. The method as claimed in claim 11, further comprising:
   sending a detection signal to the control unit indicating whether at least the person is present in the motor vehicle, and
   switching off the internal combustion engine by the control unit when a transition of the detection signal from person present to no person present takes place in the remote start state.

13. The method as claimed in claim 12, further comprising ending said measuring of the time period in the remote start state upon at least one of receiving a further remote start signal and operation of at least one member of the first device group.

14. The method as claimed in claim 10, further comprising:
   sending a detection signal to the control unit indicating whether at least the person is present in the motor vehicle, and
   switching off the internal combustion engine by the control unit when a transition of the detection signal from person present to no person present takes place in the remote start state.

15. The method as claimed in claim 10, further comprising:
   determining, in the remote start state and before driving off, whether an authorized person is carrying out a predetermined suitable operating action for driving off;
   switching the motor vehicle, with continuous operation of the internal combustion engine, to a normal engine running state in which the internal combustion engine is running and the second device group is connected to the battery, when the predetermined suitable operating action has been determined to be authorized; and
   switching the motor vehicle to an OFF state in which at least the internal combustion engine is switched off, upon detection of an unauthorized person by said determining.

* * * * *

UNITED STATES PATENT AND TRADEMARK OFFICE
CERTIFICATE OF CORRECTION

| | |
|---|---|
| PATENT NO. | : 9,604,650 B2 |
| APPLICATION NO. | : 14/902543 |
| DATED | : March 28, 2017 |
| INVENTOR(S) | : Martin Geissenhoener et al. |

It is certified that error appears in the above-identified patent and that said Letters Patent is hereby corrected as shown below:

In the Specification

Column 1, Line 10: Delete "10 2013 010 094.1" and insert -- 10 2013 010 984.1 --, therefore.

Signed and Sealed this
Twenty-fifth Day of July, 2017

Joseph Matal
*Performing the Functions and Duties of the*
*Under Secretary of Commerce for Intellectual Property and*
*Director of the United States Patent and Trademark Office*